United States Patent
Dick et al.

(10) Patent No.: US 6,595,029 B1
(45) Date of Patent: Jul. 22, 2003

(54) PROCESS FOR DEVICES FOR THE PRODUCTION OF INTERNALLY-HARDENED GLASS TUBES AS WELL AS THEIR USE

(75) Inventors: Erhard Dick, Mitterteich (DE); Erich Fischer, Mitterteich (DE); Roland Fuchs, Mitterteich (DE)

(73) Assignee: Schott Spezialglas GmbH, Mainz (DE)

( * ) Notice: Subject to any disclaimer, the term of this patent is extended or adjusted under 35 U.S.C. 154(b) by 236 days.

(21) Appl. No.: 09/662,924

(22) Filed: Sep. 15, 2000

(30) Foreign Application Priority Data

Sep. 15, 1999 (DE) .......................... 199 44 268

(51) Int. Cl.⁷ .................. C03B 15/14; C03B 15/18; C03B 21/00
(52) U.S. Cl. .............. 65/86; 65/26; 65/30.13; 65/31.14; 65/60.5; 65/60.53; 65/60.7; 65/60.1; 65/126; 65/187; 65/191; 65/DIG. 9; 427/11; 427/133; 427/230
(58) Field of Search ............ 65/26, 30.13, 30.14, 65/60.5, 60.53, 60.7, 60.1, 86, 126, 187, 191, DIG. 9; 427/11, 133, 230

(56) References Cited

U.S. PATENT DOCUMENTS

| | | | |
|---|---|---|---|
| 1,439,410 A | * | 12/1922 | Gray |
| 3,298,808 A | * | 1/1967 | Macks |
| 3,314,772 A | | 4/1967 | Poole et al. |
| 3,410,675 A | * | 11/1968 | Dockerty |
| 4,717,607 A | | 1/1988 | Pfizenmaier et al. .......... 428/35 |
| 6,200,658 B1 | | 3/2001 | Walther et al. |

FOREIGN PATENT DOCUMENTS

| | | |
|---|---|---|
| DE | 233 837 A | 3/1986 |
| DE | 259 099 A3 | 4/1986 |
| DE | 37 20 526 C2 | 6/1987 |
| DE | 692 01 380 T2 | 2/1992 |
| DE | 296 09 958 U1 | 6/1996 |
| DE | 198 01 861 A1 | 7/1999 |
| EP | 0 501 562 A1 | 9/1992 |
| EP | 0 737 562 A2 | 10/1996 |
| GB | 2 027 689 A | 2/1980 |

OTHER PUBLICATIONS

H.A. Schaeffer et al., Glastechn. Ber. 54 (1981) No. 8, pp. 247–256.

M. Walther, "Packaging of Sensitive Parenteral Drugs in Glass Containers with a Quartz–like Surface", Pharmaceutical Tech. Europe, May 1996, vol. 8, No. 5, pp. 22–27.

Heinz G. Pfaender, "Schott Guide to Glass," Chapman & Hall, pp. 93–94 (1996 edition).

English Language Abstract of German Patent DD 233 837 A1.

* cited by examiner

*Primary Examiner*—Michael Colaianni
(74) *Attorney, Agent, or Firm*—Millen, White, Zelano & Branigan, P.C.

(57) ABSTRACT

The invention relates to a process for the production of internally-hardened glass tubes, in which in a tube-drawing process for the production of glass tubes that is known in the art, a coated drawing tool, for example in the process according to Danner a coated mandrel or in the process according to Vello or in A-drawing process a coated needle, is used, whose coating releases coating material upon contact with the inside surface of the tube that is produced and accumulates on the inside glass surface. The chemical resistance is increased by this internal hardening. The invention also relates to devices for implementing this process and uses of the tubes that are produced according to these processes.

14 Claims, 2 Drawing Sheets

PROCESS FOR DEVICES FOR THE PRODUCTION OF INTERNALLY-HARDENED GLASS TUBES AS WELL AS THEIR USE

The invention relates to a process for the production of internally-hardened glass tubes, devices for performing the process as well as uses of the tubes that are produced according to the process.

For numerous applications of glass tubes or of glass molded elements that are formed from glass tubes (semifinished products), high chemical resistance is necessary.

Hollow glass molded elements, which require an elevated chemical resistance of the inside surface, are, for example, those for chemical plant production which are used for flowmeters for chemically aggressive media for analytical purposes (e.g., burette tubes, titration cylinders, etc.)

for reagent glasses for special purposes for sheathings for measurement electrodes in aggressive media for lighting purposes, e.g., halogen lamps for discharge lamps which are used as components for biotechnological reactors, and which are used as containers for medical purposes (e.g., ampoules, vials, syringe bodies, cylinder ampoules, etc.).

It is known to produce glass tubes from silica glass (quartz glass, $SiO_2$ glass) as semifinished products for shaping hollow glass molded elements, which have a very high chemical resistance. Such tubes are very production-intensive and costly, however, because of the high melting point of the $SiO_2$ glass; they can also be produced only with limited optical quality and are not well suited for mass production. In addition, such tubes can be deformed only with very special devices, since, on the one hand, the deformation temperatures are very high, and, on the other hand, the temperature range in which deformations are possible is very small.

Semifinished product-glass tubes made of silica glass therefore cannot be produced with sufficient quality and economic efficiency for mass applications.

Predominantly low-melting glasses, e.g., borosilicate glasses or soda-lime glasses are therefore used for industrial glass tube products. The latter can be advantageously economically produced and deformed as tubes.

Processes that increase the chemical resistance of the inside surface of such glass tubes made of low-melting glass are already known.

Processes in which the glass surface is chemically leached out are known.

In this respect, a correspondingly aggressive gas, typically $SO_2$ or HCl gas, is introduced into the still hot glass tube, which results in surface reactions and reduction of the alkali content in the surface.

Such dealkalizing processes are described in, e.g., H. A. Schaeffer et al.; Glastechn. Ber. 54 (1981) No. 8, pp. 247–256. The drawbacks of these processes are that mainly toxic gases are used, whereby the glass surface still can contain traces of these aggressive reaction gases according to the chemical treatment, and that the glass surface structure is damaged, which results in an increased surface area and in active centers of the surfaces. The use of such aggressive gases from environmental standpoints and worker-safety conditions is also disadvantageous. During deformation of such leached-out glass tubes, particles from the porous, damaged surface can dissolve. A washing process for removing the reaction products is also necessary before the leached-out glass tubes are used. This washing process makes necessary a subsequent drying and disposability of the reaction products, i.e., it increases the costs for the production of semifinished-product-glass tubes.

U.S. Pat. No. 3,314,772 describes another process for dealkalization of low-melting glass by fluorination using fluorine-containing compounds, e.g., aqueous HF solutions, which has the same typical main drawbacks as the other previously described processes for dealkalization.

To avoid the drawbacks of the dealkalization process, it is also known to provide tube-like glass containers that consist of low-melting glass, which are used especially as packaging for pharmaceutical materials, on their inside surface with a silicon oxide ($SiO_2$) layer, which is comparable in its inertness to a quartz glass surface (M. Walther, "Packaging of Sensitive Parenteral Drugs in Glass Containers with a Quartz-like Surface" from Pharmaceutical Technology Europe, May 1996, Vol. 8, No. 5, pages 22–27.

The coating of the inside surface of the formed glass molded element is carried out in this case by chemical deposition of oxidic coating material from its gas phase, especially using a vacuum-supported plasma-CVD process (PECVD=plasma-enhanced chemical vapor deposition), and especially using a pulsed plasma (PICVD=plasma-pulse-chemical-vapor deposition).

In the known case (DE 296 09 958 U1), the finish-formed containers, i.e., the glass molded elements themselves, are coated inside. As a result, each glass form container per se, matched to its form, must be subjected to an expensive coating process.

A feature of the invention is now to harden glass tubes that produce the semifinished product for the various hollow glass molded elements in a simple way on their inside surface.

In a tube-drawing process that is known in the art for the production of glass tubes, a coated drawing tool is used, for example in the Danner process as disclosed in U.S. Pat. No. 1,218,598; a coated Danner mandrel, or in the Vello process a coated Vello needle (see Heinz G. Pfaender, "Schott Guide to Glass," Chapman & Hall, pp. 93–94 (1996 edition)) whereby the improvement is a coating that releases coating material to the glass surface upon contact with the inside surface of the tube that is produced.

By this "doping," the inside surface of the finished tube is hardened. It is passivated and has an elevated chemical resistance.

The release of the coating material should achieve a sufficient effect such that at least 1.5 $\mu g/(m^2 s)$ of the coating surface is released from the coating. The general release rate of the coating surface can be from about 1.5–about 15 $\mu g/(m^2 s)$, the preferred release rate of the coating surface can be $\geq$ about 5.0 $\mu g/(m^2 s)$, and the optimal release rate of the coating surface can be about 15 $\mu g/(m^2 s)$. This is ensured by the material that is used and its surface composition.

Suitable coating materials are inorganic materials, e.g., nitrides or preferably oxides, which are themselves sufficiently inert against water, acid or lye attack and in which sufficient diffusion and solution processes on the coating/glass interfaces occur at the temperatures and viscosities in this process step (about 700° C.–1400° C. and about $10^{3.3}$ dPas–$10^{7.3}$ dPas). In the case of glasses with a transformation temperature of $T_9 < 500°$ C., only very small diffusion and solution amounts are produced because of the low process temperatures, and no significant degree of concentration of the coating material occurs on the inside tube surface. Since the time of contact between glass and coating is limited, coating materials with relatively high diffusion coefficients are effective.

Preferred materials have diffusion coefficients of at least $1 \times 10^{-13}$ m$^2$/s at operating temperature. The diffusion coefficients that are indicated for the materials relate to a temperature range of about 800° C. to about 1200° C., which is in the range of the operating temperatures (see above: temperatures in the process step): e.g., $ZrO_2$: $\approx 3.8 \times 10^{-11}$; with concentration proportions of about 0.1–5% by weight of RN, $R_3N_4$, $RO_2$, RO, $R_2O_3$, doped $SiO_2$: $\approx 7.7 \times 10^{-11}$; $Al_2O_3$: $\approx 1 \times 10^{-13}$. Especially suitable are $ZrO_2$, $Al_2O_3$, $SiO_2$, MgO and mixtures thereof, mullite, mixtures of the above-mentioned oxides with about 0.1–20% by weight of $RO_2$, RO, $R_2O_3$, RN, $R_3N_4$, e.g., with $Y_2O_3$, or spinel ($MgAl_2O_4$) where R is Y, Ca, Mg, K, Si, Al, B, Ti, Mn, or Co. Coatings that consist of $ZrO_2$ or with proportions of $ZrO_2$, especially with proportions of at least 5% by weight of $ZrO_2$, are especially preferred.

The coating can be applied with the commonly used processes to the drawing tool, which include, i.a., ceramic materials such as chamotte, sillimanite, zirconium oxide, zirconium silicate, spinel, cordierite, aluminum titanite, or metallic layers or metallic bases with a continuous temperature resistance of at least 1250° C. These are, e.g., the LPPS (low-pressure plasma-sprayed) process and the APPS (atmospheric pressure plasma sprayed) process, whereby the last-mentioned process is especially suitable because of the formation of a porous layer.

The main element of each plasma coating unit is the plasma spray gun. Components of the plasma spray gun are tungsten electrodes and the copper nozzles that are arranged concentrically thereto. To produce plasma, an arc is ignited between cathode and anode (nozzle). In this case, the gas that is supplied concentrically to the cathode (often a mixture of argon and helium or hydrogen) is ionized and heated extremely strongly (average gas temperature about 10,000 K). The highly heated gas is greatly accelerated and forms the plasma flame outside of the plasma spray gun. Inside the nozzle, the spray powder is supplied with a feeder gas (frequently argon). Speeds of several 100 m/s are achieved. During impact on the drawing tool, the spray powder particles solidify and form interconnecting layers. Process parameters that are known to one skilled in the art, such as the angular position of the plasma nozzle and the grain size distribution of the plasma powder that is used, influence the resulting porosity of the layer. The open pore space of the coating zone should be more than about 10%, preferably at least about 15%.

Generally, layer thicknesses of between about 10 $\mu$m and about 2000 $\mu$m are produced. Layer thicknesses of about 10 $\mu$m are already sufficient. The large surface area that is essential to achieve a sufficient effect can also be described by the specific surface area [m$^2$/kg of coating agent] instead of by the porosity. It should be at least about 50 m$^2$/kg, preferably about 75 m$^2$/kg. The process according to the invention can be used in all tube-drawing processes that use a drawing tool, which is used to form the tube cavity or supports the latter. In this case, these are tube-drawing processes that are known in the art and proven, of which the most common are to be outlined briefly:

In the Danner process, a slightly tilted, slowly rotating tube, the Danner mandrel, on which a continuous strand of glass melt accumulates, is used as a drawing tool. At the lower end of the mandrel, the head of the mandrel, the glass is drawn off under the formation of the "bulb," whereby a cavity is formed by supplying air through the hollow shaft of the mandrel. After deflection to the horizontal, the solidified tube passes through a gravity-roller conveyor to the drawing machine, behind which separation into tube sections is carried out by chopping.

In the Vello process, the glass melt that is already in tube form flows from the feeder, since it exits through a cylindrical nozzle. The melt flows through a mandrel, the Vello needle, the corresponding drawing tool of this process. Here, the glass is formed into a tube. Also here, the procedure is performed with blow air pressure. The tube first flows perpendicularly downward, it is then diverted horizontally and drawn off via a gravity-roller conveyor as in the Danner process, cooled and cut to length.

Also in the A-drawing process (down-draw process), the glass melt already flows in tube form from the feeder, since it exits through a cylindrical form. It flows over the drawing tool, a mandrel, here an A-drawing needle, where the glass is formed into a tube. In this process, the operation can be performed with air. The tube flows perpendicularly downward and is cut to length without deflection at temperatures of about 300° C.

Both in the Vello process and in the A-drawing process, not only the needle element but also the holding shaft that is up to 2 m in length is coated. Both needle element and holding shaft are used combined here under the term needle or, in general, drawing tool.

Because of the larger glass contact surface area and thus the higher retention time, the Danner process is especially well suited for the process according to the invention. Depending on the size of the Danner mandrel, retention times of 0.5 to 4 hours are present at the coating material/glass interface, while the retention times in the Vello process and in the A-drawing process are only 30 to 50% of it.

The device according to the invention is distinguished in that a device for drawing glass tubes that is known in the art with device parts that are known in the art has a coated drawing tool, whose coating releases coating material on the glass surface upon contact with the inside surface of the glass tube that is produced.

A special device according to the invention with a tube-drawing unit according to Danner is distinguished in that an inclined, rotatable, axisymmetrical, coated mandrel is arranged in it. Thus, sufficient material from the coating is released on its inside glass surface when the glass tube is drawn, and the coating material that preferably contains $ZrO_2$ and/or $SiO_2$ and/or $Al_2O_3$ and/or MgO preferably has a diffusion coefficient of at least $1 \times 10^{-13}$ m$^2$/s. The preferred materials and their surface properties and layer thicknesses are mentioned in the description of the process.

Such a device for tube-drawing according to Danner has in addition a nozzle from which the glass runs from the feeder channel to the mandrel. It further has a furnace, for example a gas-heated muffle furnace, for setting a temperature gradient between the discharge from the nozzle and the end of the mandrel and a blowing device for imposing an overpressure or underpressure relative to the ambient pressure on the interior space of the glass tube that is to be drawn off.

In the Danner process, the temperature difference between the discharge from the nozzle and the end of the mandrel based on the type of glass and the tube that is to be manufactured is about 400 K. In this case, regardless of the type of glass, the viscosity range between the discharge of the nozzle and the end of the mandrel is $10^{3.3}$ to $10^{5.9}$ dPas based on the tube that is to be manufactured.

The build-up of the inside surface of the tube with the coating material can also be influenced to a small extent by:
the specific mandrel load in kg/m²×h
the introduction of energy in the gas-heated muffle furnace
the size of the muffle furnace
the heat conductivity of the material of the Danner mandrel
the material of the muffle furnace
the entire construction of the mandrel.

A special device according to the invention with a tube-drawing unit according to Vello or an A-drawing-tube-drawing unit is distinguished in that a coated tube-drawing needle is arranged perpendicular in it. Here, the same materials and layer thicknesses as described above are preferred as coating. Its diffusion coefficient is preferably at least $1 \times 10^{-13}$ m²/s. It further has a preferably electrically heated muffle for controlling the deformation temperature and a blowing device for imposing an overpressure or underpressure on the interior space of the glass tube that is to be drawn off. The unit according to Vello has a deflecting device, with which the glass hose in the plastic state is deflected to the horizontal.

Instead of a coated drawing tool, an uncoated drawing tool can also be used in the process for the production of internally-hardened glass tubes, said tool which is itself sufficiently porous and which releases material, which is accumulated on the inside glass surface, during contact with the inside surface of the tube that is produced.

The properties and preferred implementations with respect to material, material release, diffusion coefficient correspond in a porous drawing tool to those of the porous coating of a drawing tool. A drawing tool that is made of $ZrO_2$ or sillimanite is preferably used. The drawing tool is to have a porosity, i.e., an open pore space, of at least 10%. Of course, porous elements can be produced, for example, by sintering.

For this process with a porous drawing tool, the Danner process is especially suitable with use of a porous mandrel that is made of, for example, $ZrO_2$ or sillimanite.

The release of the material is low both in the coated drawing tools and in the porous elements, so that it is unproblematic for the service life of the drawing tool.

Example: A drawing needle that is coated with 93% by weight of $ZrO_2$ and 7% by weight of $Y_2O_3$ with a coating thickness of 400 µm was run for 28 days at temperatures from 1240° C. in an aluminosilicate glass with a glass throughput of about 5 tons/day. After this time, a reduction of the coating thickness by about 20 µm (corresponds to about 5%) was used. From this, a service life of about 500 days can be projected. The service life of noble metal components is on average about 1 year.

Below, the invention will be further explained based on the figures and the embodiments:

In the figures, the visualization is limited to the device that uses the forming; in each case the components, usually not shown, are arranged such that drawing channel is connected to drawing web and drawing machine to a separating device.

Figure 1:
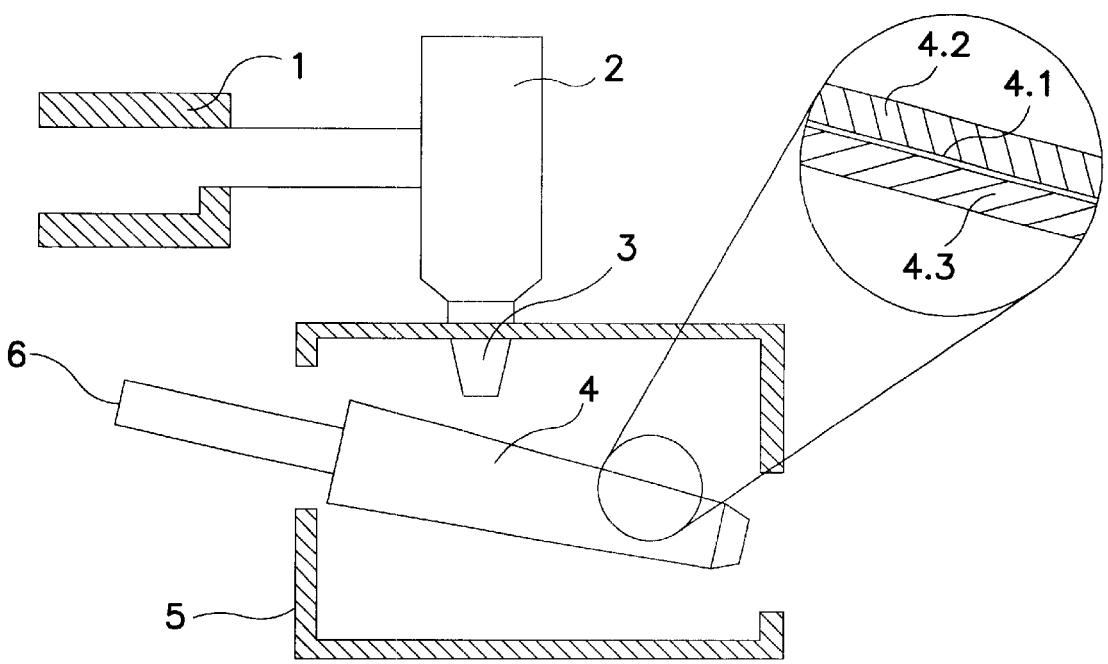
FIG. 1 shows diagrammatically the creation of a device with a tube-drawing unit according to Danner.

In the tube-drawing unit according to Danner, FIG. 1 shows the glass melt that contains distributor 1 and crucible 2. Via nozzle 3, the molten glass exits from the latter as a continuous strand and strikes the drawing tool, the inclined, rotating mandrel 4 having a surface 4.3, a coating 4.1 and the glass 4.2 thereon. The mandrel and the discharge from the nozzle are located in a furnace 5, which ensures a temperature gradient between the discharge from the nozzle and the end of the mandrel. A blowing device 6 imposes an overpressure relative to the ambient pressure on the interior space of the glass tube that is to be drawn off.

The glass is drawn off from the mandrel, and (no longer drawn in), deflected to the horizontal.

Figure 2:
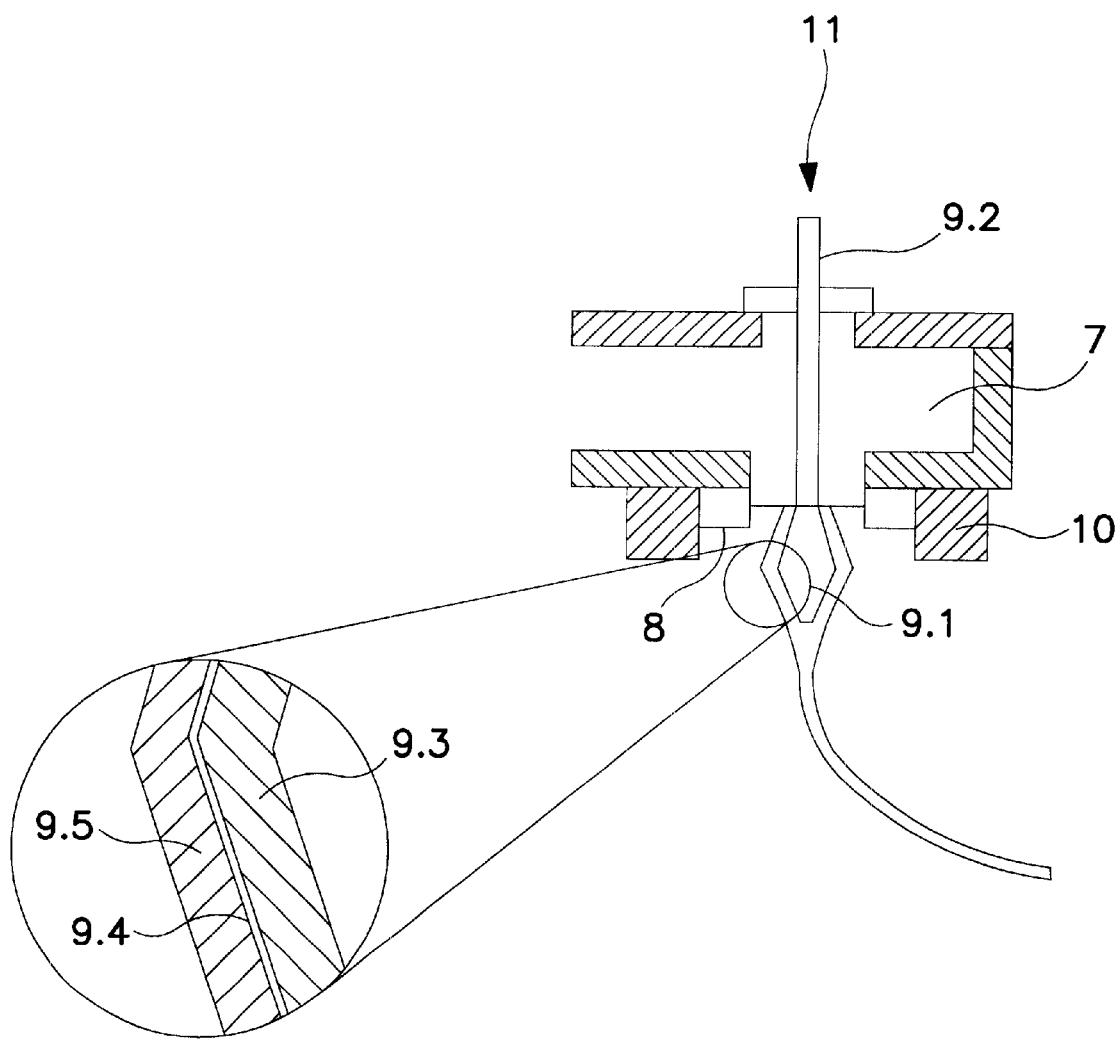
FIG. 2 shows diagrammatically the creation of a device with a tube-drawing unit according to Vello.

In the device according to FIG. 2, via cylindrical nozzle 8 the glass from crucible 7 strikes perpendicular Vello needle having a needle element 9.1, which has a needle surface 9.3, coatine 9.4 and the glass 9.5, and a needle shaft 9.2. The nozzle is in muffle 10.

The tube that flows out perpendicularly from the needle is deflected to the horizontal and drawn off.

Also during the A-drawing, analogously to FIG. 2, via cylindrical nozzle 8, the glass from crucible 7 strikes a perpendicular A-drawing needle 49.1 and 9.2. It is in a muffle 10. Blow air is also supplied here at 11-position through needle 49.1 and 9.2. In contrast to the Vello process, the tube that flows out perpendicular from the needle remains in perpendicular direction.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

1) With the aid of the Danner process with a mandrel whose surface, using the APPS process, is provided with a coating that consists of a mixture of 93% by weight of $ZrO_2$ and 7% by weight of $Y_2O_3$ with a layer thickness of 450 µm, tubes with an outside diameter of 10.75 mm and a wall thickness of 0.50 mm and with an outside diameter of 22.00 mm and a wall thickness of 1.00 mm are drawn from an alkali-containing and alkaline-earth-containing aluminoborosilicate glass with a Tg of 550° C.

The retention times are 110 or 120 minutes, and the mandrel length is 1.5 m. The necessary mandrel length follows from the specific mandrel load [kg/m²×h] and the mandrel diameter. A dependence on the drawing speed does not exist, since changes in the flow speed occur only after the glass leaves the mandrel. In the usual Danner units, the process according to the invention is feasible without principle changes of process control parameters. The usual variations in the drawing process for setting the best drawing conditions are known to one skilled in the art. The coating unit is generally about 70% of the Danner mandrel length.

The tubes that are thus drawn have a $ZrO_2$ content on their inside surface and in a thin surface area. This is about 10% by weight directly on the surface and drops to about 0.4% by weight at a depth of 0.16 mm.

2) With the aid of the Vello process with a tube-drawing needle, whose surface is coated with 93% by weight of $ZrO_2$ and 7% by weight of $Y_2O_3$ according to the APPS process with a layer thickness of 450 µm, tubes with an outside diameter of 16.00 mm and a wall thickness of 1.4 mm and with an outside diameter of 11.3 mm and a wall thickness of 1.0 mm are drawn from an alkaline-earth-containing alkali-free aluminoborosilicate glass (Tg=725° C.), which contains 1% by weight of $ZrO_2$.

On their inside surface, the tubes that are thus drawn have a $ZrO_2$ content of 3.5% by weight, which drops inside the glass to 0.3% by weight at a depth of 0.1 mm. These concentration yields that are measured using SIMS represent the respective relative difference to the basic glass.

This alteration of the inside surface of the tube represents a hardening, since its chemical resistance is considerably improved, as the measuring results below demonstrate:

The aluminoborosilicate glass (75% by weight of $SiO_2$, $B_2O_3$; 5 $Al_2O_3$; 7 $Na_2O$; 5 BaO, 1.5 CaO) that is processed into tubes under 1) already has very good chemical resistance even without the treatment according to the invention, namely a hydrolytic resistance according to DIN 52339-ISO 4802 of hydrolytic class 1, an acid resistance according to ISO 11776 of acid class 1 and an alkali resistance according to ISO 695 of alkali class 2. Another improvement of the already very good chemical resistance also has the advantage, i.a., that the glass can be exposed to higher temperature in the processing to products such as, e.g., ampoules, without resulting in exceeding boundary values relative to the leaching-out.

From the tubes that are drawn according to 1), ampoules (A) are formed with a nominal volume of 2 ml and a tube dimension of 10.75 mm of outside diameter and 0.50 mm of wall thickness. As a comparison, ampoules (V) of the same dimensions from tubes that are drawn in a Danner unit with uncoated mandrels under otherwise equal conditions are examined.

a) Surface-testing processes according to DIN 52 339 for determining the hydrolytical resistance (flame-photometric determination):

|  | A | V |
|---|---|---|
| Na-Leaching out | 2.22 ppm of $Na_2O$ | 2.37 ppm of $Na_2O$ |
| Class | 1 | 1 | b) Determination of the acid resistance in a way similar to ISO 1776: in each case 2.5 ml (approximately neck size) of pre-tempered HCl©=6 mol/l) is loaded into the purified ampoules and placed in the drying oven for 3 hours at 100° C. Then, the $Na_2O$ content is determined (in mg/filling volumes) and converted onto the wetted inside surface (in $dm^2$) with the result in mg of $Na_2O$/$dm^2$. The determination is made with FAS (flame absorption spectroscopy):

|  | A | V |
|---|---|---|
| Na-Leaching out | 0.066 mg of $Na_2O/dm^2$ | 0.075 mg of $Na_2O/dm^2$ | c) Determination of the alkali resistance in a way similar to ISO 695:

In each case, 2.5 ml (approximately neck size) of pre-tempered mixed alkali according to DIN is loaded into the purified ampoules and placed in the drying oven for 3 hours at 100° C. To prevent supersaturation or a larger pH drop in the solution, the mixed alkali is replaced hourly. Then, the weight loss is measured in mg and converted onto the wetted surface of the test piece with the result in mg/$dm^2$ of weight loss.

|  | A | V |
|---|---|---|
| Weight loss | 43 mg/$dm^2$ | 50 mg/$dm^2$ |

In the studies according to b) and c), no class data according to ISO can be indicated, but the results of A and V represent only a comparison below one another, since the tests are performed only in a way similar to the above-mentioned standards. Both in the determination of the acid resistance according to ISO 1776 and in the alkali resistance determination according to ISO 695, the glass that is to be studied is crushed into grit and then studied. For an inside surface hardening, such study methods are not expressive since only the smallest ranges of glass wall thickness are concentrated with coating material.

In all measured aspects of chemical resistance, an improvement is shown in the internally-hardened tubes.

With the process according to the invention, it is thus possible to make available glass tubes whose inside surface is hardened so that they are suitable as semifinished products for hollow glass molded elements, on which high requirements are set relative to the chemical resistance of their inside surface.

A semifinished product (or semifinished article) is, of course, a semifinished product, an item between raw material and finished article, that has undergone various fabrication stages behind it, but still must pass through others.

In the actual case, the deformation of glass tubes involves different hollow glass molded elements. Such deformation processes are, e.g., processes in which at the end of the glass tube, tapers, melt points and deformations are made, e.g., to append together, to seal, and to connect, etc., the latter.

Hollow glass molded elements with a degree of forming that is small are, e.g., cylindrical elements, which are produced from the semifinished product by hot- or cold forming, and which ultimately must be "worked" only on their front sides. Such glass molded elements are, for example, barrels.

Hollow glass molded elements with a higher degree of forming are, e.g., bulbs, vials and ampoules.

Even in such glass molded elements, the chemical resistance of the inside surface is improved, when glass tubes that are produced according to the process of the invention are used in their production.

The glass tubes that are produced according to the processes of the invention thus are extremely well suited to be used for, for example, the production of Containers for medical purposes, such as ampoules, vials, syringe bodies, barrel ampoules, bulbs, especially bulbs for halogen lamps reagent glasses, burettes, pipettes, titration cylinders tubular parts for chemical plant production, components for biotechnological reactors.

Since in the process according to the invention the internally-hardened glass tubes are produced continuously and without additional processes steps, compared to the production of non-hardened glass tubes, this is a very simple and economical process, compared to the previous processes such as the leaching-out of the inside surface of the glass tubes or even the inside layers of hollow glass molded elements.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited above or below, and of corresponding German application No. 199 44 268.1-45, filed Sep. 15, 1999 is hereby incorporated by reference.

What is claimed is:

1. A process for the production of an internally-hardened glass tube, comprising: preparing a tube by a tube-drawing process employing a drawing tool, wherein the drawing tool comprises a coating which upon contact with an inside surface of the tube being produced is released and accumulates on the inside surface.

2. The process according to claim 1, wherein the drawing tool releases at least 1.5 $\mu g/(m^2 s)$ of coating material.

3. The process according to claim 1, wherein the drawing tool has a specific surface area of at least 50 $m^2/kg$.

4. The process according to claim 1, wherein the coating of the drawing tool has an open pore space of more than 10%.

5. The process according to claim 1, wherein the drawing tool is a coated mandrel.

6. The process according to claim 1, wherein the coated drawing tool is a coated needle.

7. The process according to claim 1, wherein the coating material of the coated drawing tool has a diffusion coefficient of at least $1\times10^{-13}$ $m^2/s$.

8. The process according to claim 1, wherein the coating of the coated drawing tool comprises $ZrO_2$, $Al_2O_3$, $SiO_2$ and/or MgO.

9. The process according to claim 1, wherein the coating of the coated drawing tool comprises $ZrO_2$.

10. A process for the production of internally-hardened glass tubes comprising providing a porous drawing tool releasing material upon contact with the inside surface of the produced tube whereby material accumulates on an inside glass surface of the tube.

11. The process according to claim 10, wherein the porous drawing tool releases at least 1.5 $\mu g/(m^2 s)$ of material.

12. The process according to claim 10, wherein the porous drawing tool has an open pore space of more than 10%.

13. The process according to claim 10, wherein the porous drawing tool is a porous mandrel.

14. The process according to claim 10, wherein the porous drawing tool comprises $ZrO_2$, $Al_2O_3$, and/or $SiO_2$ and having a diffusion coefficient of at least $1\times10^{-13}$ $m^2/s$.

* * * * *

UNITED STATES PATENT AND TRADEMARK OFFICE
CERTIFICATE OF CORRECTION

PATENT NO.     : 6,595,029 B1                                              Page 1 of 1
DATED          : July 22, 2003
INVENTOR(S)    : Dick et al.

It is certified that error appears in the above-identified patent and that said Letters Patent is hereby corrected as shown below:

<u>Title page,</u>
Item [54], Title, reads "FOR," (first occurance) should read -- AND --

Signed and Sealed this

Twenty-fifth Day of May, 2004

JON W. DUDAS
*Acting Director of the United States Patent and Trademark Office*